United States Patent Office 3,436,194
Patented Apr. 1, 1969

3,436,194
PROCESS FOR PREPARING NITROSYL
HYDROGEN PYROSULFATE
Giuseppe Ribaldone, Gallarate, Varese, Franco Smai, Novate Milanese, and Carmine Garbuglio, Milan, Italy, assignors to Montecatini Edison S.p.A., Milan, Italy
No Drawing. Filed June 16, 1964, Ser. No. 375,622
Claims priority, application Italy, July 8, 1963, 14,329/63
Int. Cl. C01b 17/98; C07b 29/00
U.S. Cl. 23—357                 9 Claims

ABSTRACT OF THE DISCLOSURE

A process for the preparation of nitrosyl hydrogen pyrosulfate wherein nitrosyl hydrogen sulfate is reacted with a sulfonating agent having substantially the formula $ClSO_3H$ and containing reactive sulfur trioxide, or with sulfur trioxide, the nitrosyl hydrogen sulfate and reactive sulfur trioxide being present in a molar ratio ranging between substantially 1:1 and 1:5, and recovering the nitrosyl hydrogen pyrosulfate as a compound from the reaction mixture.

---

Our present invention relates to a process for preparing a new chemical entity having substantially the empirical formulas $HNS_2O_8$ and the apparent structural formula $NO—HS_2O_7$.

In the concurrently filed and commonly assigned copending application Ser. No. 375,621, entitled, Nitrosyl Hydrogen Pyrosulfate, there is described and claimed a new chemical entity or product possessing a nitrosyl group and characterized by a crystalline appearance, a melting point range of substantially 114° to 116° C. and a characteristic X-ray diffraction spectrum indicative of the presence of NO (nitrosyl) groups and pyrosulfate groups. From the empirical formula $HNS_2O_8$ of this product, which gives all indications of being a true compound, and the diffraction pattern, a structural formula $NO—HS_2O_7$ has been assigned and the product designated by the name "nitrosyl hydrogen pyrosulfate" by an analogy to other nitrosyl compounds.

The new compound has been found to be a useful reagent in all of those processes making use of a reactive NO group and/or the nitrosonium ion. It may thus be used as a substitute for nitrites and/or earlier nitrosyl compounds in diazotization, nitrosation and oximation reactions; thus it may be noted that nitrosyl hydrogen pyrosulfate can serve as a substitute for nitrite in the diazotization of primary aromatic amines, the nitrosation of secondary aromatic amines, or the addition of an NO group to a carbonyl in oximation reactions. To the best of our knowledge, a compound of this nature has not been described earlier in the chemical literature, so that no method for its preparation has been put forth.

It is the principal object of the present invention, therefore, to provide a method of producing nitrosyl hydrogen pyrosulfate.

A more specific object of this invention is to provide a method of producing nitrosyl hydrogen pyrosulfate in a relatively pure state and with high yields.

These objects and others which will become apparent hereinafter are attained in accordance with the present invention by a process for the preparation of nitrosyl hydrogen pyrosulfate which comprises the step of directly reacting nitrosyl hydrogen sulfate (i.e., preferably without the intervention of any solvent other than the reactants themselves) with a sulfonating agent containing reactive sulfur trioxide. The sulfur trioxide apparently adds directly to the nitrosyl hydrogen sulfate without eliminating any fragments therefrom.

According to a more specific feature of this invention, the sulfonating agent is selected from the group consisting of monomeric and polymeric sulfur trioxide as well as addition compounds of sulfur trioxide having substantially the general formula $SO_3—X$, where X is an inorganic electron-donor compound adapted to add to sulfur trioxide. Preferably, however, the sulfonating agent will be either sulfur trioxide itself or chlorosulfonic acid (where X=HCl). After excess sulfur trioxide or hydrogen chloride is driven off, the white crystalline product remaining is found to have the characteristics set forth in the above-mentioned copending application and a melting point range of substantially 114° to 116° C. It is suitable for use in all chemical processes requiring a nitrosyl compound and is even more effective than earlier nitrosyls in that it is thermally stable upon heating up to temperatures of about 200° C. Thus the nitrosyl hydrogen pyrosulfate may be used in all such chemical processes wherein severe temperature conditions do not allow the use of most of the common substances having nitrosyl reactive groups.

While it is desirable to provide the nitrosyl hydrogen sulfate and reactive sulfur trioxide (i.e. either as sulfur trioxide itself or in the form of chlorosulfonic acid) in equimolar quantities, it is also possible to make use of molar ratios ranging between substantially 1:1 to 1:5 and preferably 1:1 to 1:1.2. This insures that substantially all of the nitrosyl hydrogen sulfate is reacted.

The reactions appear to take place in accordance with the following equations:

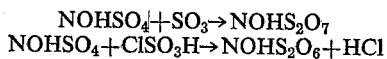

$$NOHSO_4 + SO_3 \rightarrow NOHS_2O_7$$
$$NOHSO_4 + ClSO_3H \rightarrow NOHS_2O_6 + HCl$$

In practice it has been found that best results are obtained by combining the reactants slowly with constant stirring in a reaction vessel which has provision for cooling to dissipate the reaction heat. When evolution of hydrogen chloride occurs, it may be necessary to provide some form of heating in order to facilitate such evolution. It is preferred to introduce the sulfonating agent into a reaction vessel containing the nitrosyl hydrogen sulfate although it is also possible to operate in the reverse manner. If sulfur trioxide is used, it has been found to be advantageous to use the latter in its liquid state (e.g. at a temperature on the order of its melting point or lower) to prevent its solidification in the form of polymeric sulfur trioxide which is difficult to handle. The liquid state of sulfur trioxide can be stabilized by the addition thereto of small quantities (e.g. on the order of 1% by weight) of carbon tetrachloride or nitrosyl hydrogen sulfate; these expediencies make it possible to operate at temperatures close to 0° C., the preferred temperature condition.

As previously indicated, it is possible to use an excess of the sulfonating agent (e.g. two or more moles per mole of nitrosyl hydrogen sulfate); in this case, the excess sulfonating agent functions as a diluent of the reaction mass and thereby permits more efficient stirring and easy control of the reaction conditions. At the end of the reaction, the sulfonating agent may be eliminated by distillation without difficulty.

When chlorosulfonic acid is used as the sulfonating agent, it is necessary to eliminate hydrogen chloride and, for this purpose, a mild heating of the reaction mass may occur together with or exclusively of the subjection of the vessel to reduced pressures.

The following examples illustrate the principles of the invention as set forth above:

Example I

Into a 100 cc. distillation flask equipped with a reflux condenser, dropping funnel for the introduction of liquids, and ground-glass couplings lubricated with polyphosphoric acid, 24.6 g. (0.193 mole) of nitrosyl hydrogen sulfate was introduced.

Keeping the flask externally cooled by a cold water bath, 24.1 g. (0.301 mole) of sulfur trioxide, stabilized with 1% by weight of carbon tetrachloride were introduced during a period of 5 minutes. The flask and reaction mixture was then permitted to stand overnight and the solid mass thereby formed was removed and very finely ground in a "dry-box." The powder thus obtained was then heated at 60°–70° C. and a reduced pressure corresponding to 10 mm. Hg, in order to eliminate the excess sulfur trioxide. 39.3 g. (0.19 mole) of a substance with a melting point of 114°–116° C. were obtained. The melting point of the substance in admixture with nitrosyl hydrogen sulfate was 50°–53° C.

The analysis by weight gave the following results: Found: NO, 13.51%; $SO_4$, 93.09%. Calculated for $NOHS_2O_7$: NO, 14.48%; $SO_4$, 92.75%.

The yield calculated on the base of the proposed formula $NOHS_2O_7$ was 98%.

Example II

The process in Example I is used but with the variant that the reaction was carried out between sulfur trioxide and nitrosyl hydrogen sulfate in about equimolecular quantities and that the nitrosyl hydrogen sulfate was introduced into the sulfur trioxide.

By using 72 g. (0.566 mole) of nitrosyl hydrogen sulfate and 50.5 g. (0.630 mole) of sulfur trioxide stabilized with 1% of carbon tetrachloride, 114 g. (0.55 mole) of a product were obtained which had a melting point as recovered of 112–115° C., and which was recognized to be the nitrosyl hydrogen pyrosulfate identified above.

The yield was 97.2% of the theoretical value.

Example III

Into a 250 cc. distillation flask, fitted with a ground-glass coupling lubricated with polyphosphoric acid and with a plug cock, was introduced 61.25 g. (0.482 mole) of nitrosyl hydrogen sulfate and 57.20 g. (0.490 mole) of chlorosulfonic acid.

Immediately the nitrosyl hydrogen sulfate dissolved forming an orange colored solution; at the same time gaseous hydrogen chloride bubbles evolved. The reaction mass was then heated to 30°–40° C. under vacuum (corresponding to a residual pressure of 3 mm. Hg.) in order to facilitate the elimination of the hydrogen chloride and of surplus chlorosulfonic acid.

As the hydrogen chloride formed during the reaction was gradually eliminated, the solution became increasingly clear while on the walls of the reaction vessel a deposit of a white crystalline substance was formed. This deposit increased in mass until the whole reaction mixture solidified. The heating under vacuum was maintained for several hours until a constant weight was obtained. Thus, 98 g. (0.474 mole) of nitrosyl hydrogen pyrosulfate were obtained which had a melting point of 115°–116° C.

This melting point did not suffer any reduction when the product was admixed to the nitrosyl hydrogen pyrosulfate prepared according to the Examples I and II.

The analysis, by weight, of the product have the following results. Found: NO, 14.51%; $SO_4$, 93.9%. Calculated for $NOHS_2O_7$: NO, 14.48%; $SO_4$, 92.75%.

The yield, calculated with regard to the nitrosyl hydrogen sulfate was 98.1% of the theoretical value.

The X-ray diffraction spectrum of the product of Examples I–III was determined. The reticular distance is given in terms of Angstrom units while the relative intensity is that obtained visually. The X-ray diffraction spectrum was obtained using a Debye-Sherrer chamber having a diameter of 114.83 mm. and CuKα radiation. From the data recorded in the table it will be evident that peaks characteristic of both the nitrosyl group and the pyrosulfate group are present so that the product has the theoretical or apparent structural formula: $NO—HS_2O_7$.

TABLE

| Reticular distance (angstrom units) | Relative intensity |
|---|---|
| 4.84 | Weak. |
| 4.37 | Strong. |
| 4.21 | Do. |
| 3.95 | Medium. |
| 3.52 | Strong. |
| 3.32 | Medium. |
| 3.25 | Do. |
| 3.13 | Strong. |
| 3.00 | Weak. |
| 2.692 | Medium. |
| 2.396 | Weak. |

What is claimed is:

1. A process for the preparation of nitrosyl hydrogen pyrosulfate having substantially the empirical formula $HNS_2O_8$, comprising the steps of reacting nitrosyl hydrogen sulfate with a sulfonating agent containing reactive sulfur trioxide, and recovering said nitrosyl hydrogen pyrosulfate as a crystalline compound from the reaction mass.

2. A process for the preparation of nitrosyl hydrogen pyrosulfate having substantially the empirical formula $HNS_2O_8$, comprising the steps of reacting nitrosyl hydrogen sulfate with a sulfonating agent containing reactive sulfur trioxide and selected from the group consisting of monomeric sulfur trioxide, polymeric sulfur trioxide and addition compounds of sulfur trioxide having substantially the general formula $SO_3—X$, where X is an inorganic electron-donor compound adapted to add to sulfur trioxide, and recovering said nitrosyl hydrogen pyrosulfate as a crystalline compound from the reaction mass.

3. A process for the preparation of nitrosyl hydrogen pyrosulfate having substantially the empirical formula $HNS_2O_8$, comprising the steps of reacting nitrosyl hydrogen sulfate with a sulfonating agent containing reactive sulfur trioxide and selected from the group consisting of monomeric sulfur trioxide, polymeric sulfur trioxide and addition compounds of sulfur trioxide having substantially the general formula $SO_3—X$, where X is an inorganic electron-donor compound adapted to add to sulfur trioxide, said nitrosyl hydrogen sulfate and said reactive sulfur trioxide being present in a molar ratio ranging between substantially 1:1 and 1:5, and recovering said nitrosyl hydrogen pyrosulfate as a crystalline compound from the reaction mass.

4. A process as defined in claim 3 wherein said sulfonating agent is sulfur trioxide.

5. A process as defined in claim 4 wherein said sulfur trioxide is in a liquid state upon reaction with said nitrosyl hydrogen sulfate and is stabilized by the addition thereto of a stabilizing agent selected from the group consisting of carbon tetrachloride and nitrosyl hydrogen sulfate.

6. A process as defined in claim 3 wherein said sulfonating agent is chlorosulfonic acid, further comprising the step of distilling hydrogen chloride from the reaction product.

7. A process for the preparation of nitrosyl hydrogen pyrosulfate having substantially the empirical formula $HNS_2O_8$, comprising the steps of directly reacting nitrosyl hydrogen sulfate with a sulfonating agent containing reactive sulfur trioxide and selected from the group consisting of monomeric sulfur trioxide, polymeric sulfur trioxide and addition compounds of sulfur trioxide having substantially the general formula $SO_3—X$, where X is an inorganic electron-donor compound adapted to add to sulfur trioxide, said nitrosyl hydrogen sulfate and said reactive sulfur trioxide being present in a molar ratio ranging between substantially 1:1 and 1:1.2, and recover-

Disclaimer 3,436,194.—*Giuseppe Ribaldone*, Gallarate, Varese, *Franco Smai*, Novate Milanese, and *Carmine Garbuglio*, Milan, Italy. PROCESS FOR PREPARING NITROSYL HYDROGEN PYROSULFATE. Patent dated Apr. 1, 1969. Disclaimer filed Feb. 24, 1969, by the inventors; the assignee, *Montecatini Edison S.p.A.*, consenting.

Hereby disclaims the terminal portion of the term of the patent subsequent to July 29, 1986.

[*Official Gazette September 23, 1969.*]